Dec. 30, 1924.
Y. MIYASAKI
1,521,548
BUMPER
Filed March 18, 1924    2 Sheets-Sheet 2
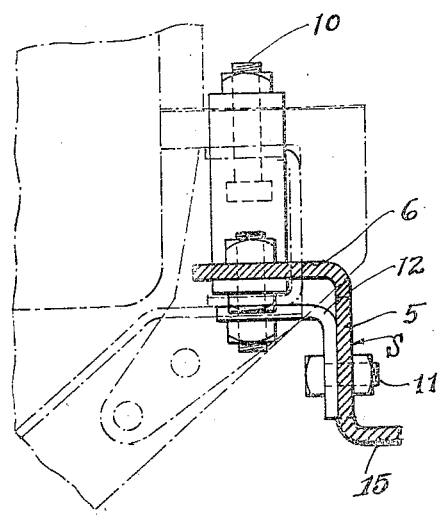
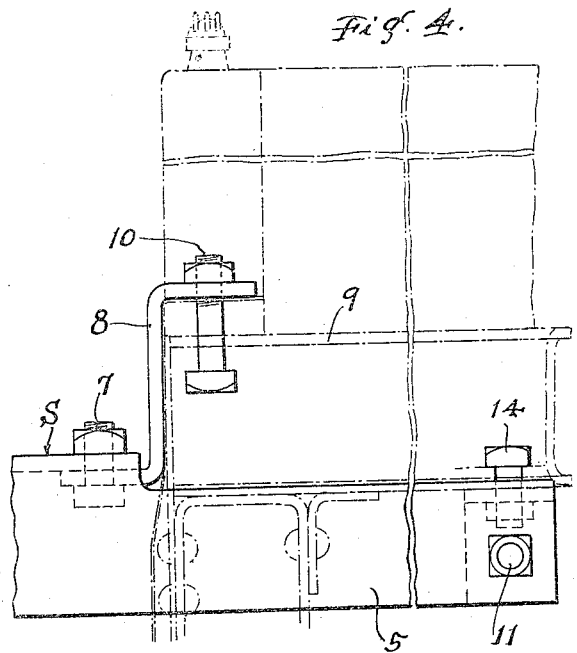
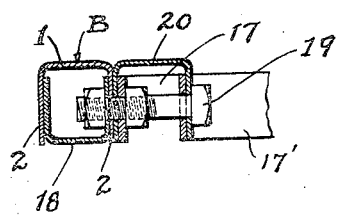
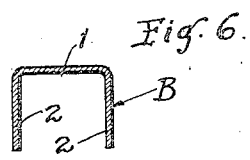
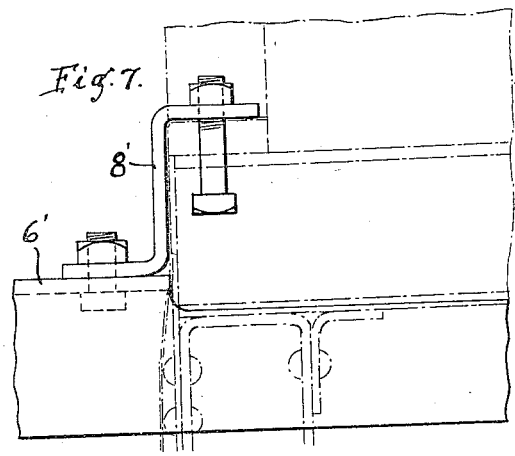
Yuske Miyasaki.
INVENTOR Patented Dec. 30, 1924.

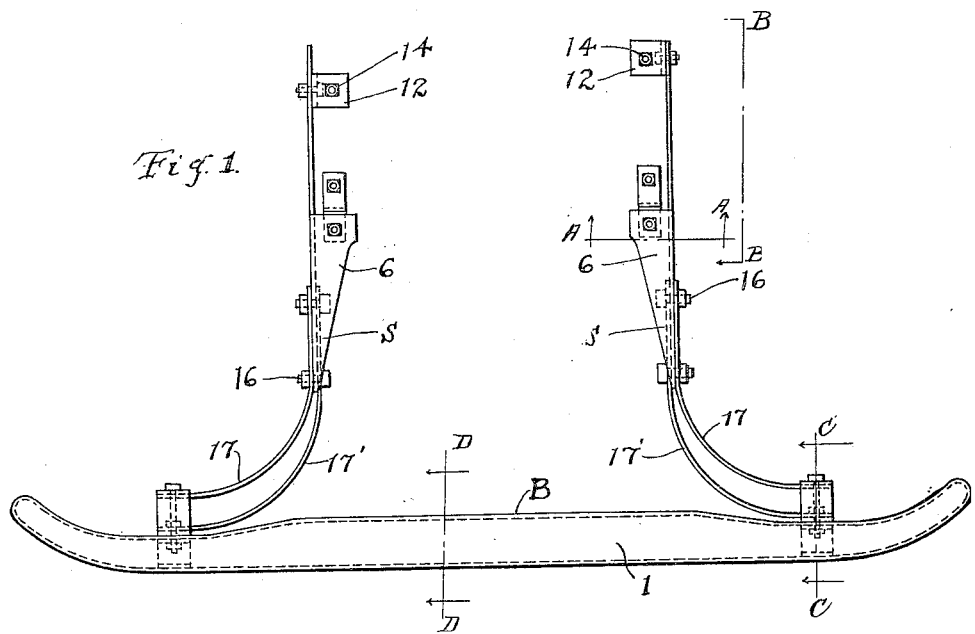
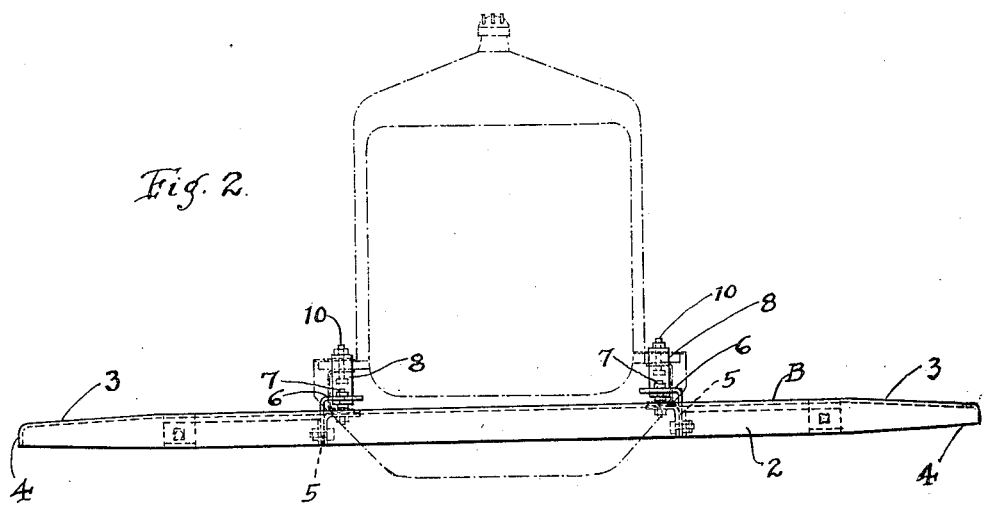

1,521,548

UNITED STATES PATENT OFFICE.

YUSKE MIYASAKI, OF HUBBARD, OHIO.

BUMPER.

Application filed March 18, 1924. Serial No. 700,085.

*To all whom it may concern:*

Be it known that I, YUSKE MIYASAKI, a subject of the Emperor of Japan, residing at Hubbard, in the county of Trumbull and State of Ohio, have invented certain new and useful Improvements in Bumpers, of which the following is a specification, reference being had to the accompanying drawings.

This invention relates to certain improvements in bumpers and has relation more particularly to a device of this general character especially designed and adapted for use in connection with motor vehicles and it is an object of the invention to provide a novel and improved device of this general character comprising a bumper proper of rigid construction to withstand impact together with springs associated therewith but separated therefrom to absorb the shock.

It is also an object of the invention to provide a novel and improved device of this general character which will offer maximum resistance to impact with the use of a minimum amount of material.

Another object of the invention is to provide a novel and improved device of this general character wherein the bumper proper has associated therewith supports which will transmit impact direct to the frame of the vehicle and thereby relieve thrust on the bolts which are employed for fastening the supports to such frame.

An additional object of the invention is to provide a novel and improved device of this general character wherein the supports for the bumper proper may be secured to the frame by taking advantage of the bolts initially employed and wherein said bolts serve as a carrier of the weight of the bumper.

The invention consists in the details of construction and in the combination and arrangement of the several parts of my improved bumper whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be better understood, I will now proceed to describe the same with reference to the accompanying drawings, wherein—

Figure 1 is a view in top plan illustrating a bumper constructed in accordance with an embodiment of my invention;

Figure 2 is a view in front elevation of the structure as illustrated in Figure 1, portions of the associated vehicle being indicated by broken lines;

Figure 3 is an enlarged sectional view taken substantially on the line A—A of Figure 1;

Figure 4 is an enlarged fragmentary view in side elevation of a portion of the structure illustrated in Figure 1 and is indicated by the line B—B;

Figure 5 is an enlarged detail sectional view taken substantially on the line C—C of Figure 1;

Figure 6 is a sectional view taken substantially on the line D—D of Figure 1;

Figure 7 is a fragmentary view in elevation illustrating a slightly modified form of the invention.

As disclosed in the accompanying drawings, the bumper B proper is of a dished type or substantially in the form of an inverted U in cross section, as particularly illustrated in Figure 6.

When in applied position, the intermediate portion or web 1 of the bumper is set horizontally with the flanges 2 downwardly disposed. By this method of application, the bending strength of the bumper B in horizontal direction for impact is greatly increased with equal amount of metal compared with the bumper in which the web is set vertically. This advantage of the present arrangement is due to the fact that more metal is concentrated near the furthest portion from the neutral axis which is believed to be self-explanatory from Figure 6. A further advantage of this method of application is that the flat surface of the flange faces a wheel of the vehicle instead of an edge of the flange. To avoid crowding of metal at the ends of the bumper during the flanging operation, each end portion 3 thereof is tapered toward the outer extremity in order to decrease, as is indicated at 4, the depth of the flanges 2 thus preventing forming of wrinkles at this point.

The middle portion of the bumper B is preferably deeper in section and the depth is decreased toward the ends so that it will offer greater resistance for bending near the center and to use less material near the ends where less strength is required. The bumper is bent near the ends in order to maintain nearly uniform clearance between the inner face of the bumper and the wheels when the vehicle turns a curve.

The bumper as herein disclosed is of a type particularly adapted for use in connection with the well-known Ford automobile and coacting with the frame of the vehicle are the supports S. Each of the supports S comprises an elongated member 5 having a forward portion of a longitudinal margin thereof defined by a laterally disposed flange 6. Secured, as at 7, to the under portion of the flange 6 is a hanger 8, said hanger being secured to a side bar 9 of the vehicle frame by a radiator bolt 10 as now generally employed. Secured, as at 11, to the rear portion of the member 5 is a clip 12 held to the side bar 9 by means of the bolt 14 now comprised in the frame structure.

The support S or more particularly the member 5 may be further strengthened or reinforced by having the lower marginal portion thereof defined by the outstanding flange 15. Bolted or otherwise secured, as at 16, to the opposite face of the member 5 of each of the supports S are the springs 17 and 17'.

Arranged within each end portion of the bumper B is a reinforcing bracket 18 substantially in the form of a U and said bracket is maintained in applied position through the instrumentality of the bolt 19, said bolt being also disposed through and maintaining in applied position the bracket 20 herein disclosed as in the form of an inverted U. The outer extremities of the springs 17 and 17' are engaged with the bolt 19 and particularly that portion thereof within the bracket 20 as is clearly illustrated in Figure 5. The function of the springs 17 and 17' is the same as that set forth with respect to the springs disclosed in my Patent No. 1,497,222, dated June 10, 1924.

The weight of the bumper B is substantially supported by the bolts 14 and hangers 8 in conjunction with the bolts 10. When the supports S receive thrust due to impact on the bumper the thrust will be transmitted to the hangers 8, the resultant pressure of which bearing on the adjacent end of the frame whereby the thrust on the supports will be taken up directly by the frame and the bolts 10 serving only to hold the hangers 8 in position whereby the bolts 10 and 14 are relieved of impact.

The hole in the member 5 of each of the supports S for the bolt 11 is preferably much larger than the diameter of the bolt so that slight deflection of the hanger 8 due to impact will be taken care of by the clearance between the bolt 11 and the wall of the hole when the support S travels slightly inward a distance equal to the deflection of the hanger 8.

As particularly illustrated in Figure 4, the hanger 8 is secured to the under surface of the flange 6 so that the impact is received entirely upon said hanger 8.

In the embodiment of my invention as illustrated in Figure 7, the hanger 8' is secured to the upper surface of the flange 6' so that the support S or more particularly the inner end of the flange 6' also bears on the adjacent end of the frame.

From the foregoing description it is thought to be obvious that a bumper constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A device of the class described comprising, in combination, a dished bumper having a marginal flange extending downwardly, and means for securing said bumper to a vehicle.

2. A device of the class described comprising, in combination, a dished bumper having a marginal flange extending downwardly, and means for securing said bumper to a vehicle, said marginal flange being decreased in depth at its extremities.

3. A device of the class described comprising, in combination, a dished bumper having a marginal flange extending downwardly, springs coacting with the opposite end portions of the bumper, the portions of the springs connected with the bumper being spaced apart, and means for connecting the springs to a vehicle.

4. A device of the class described, comprising, in combination, a dished bumper, springs coacting with the opposite end portions thereof, said bumper having a downwardly extending marginal flange, means for connecting the springs to said flange, means to brace the flange of the bumper, and means for securing the springs to a vehicle.

5. A device of the class described comprising, in combination, a dished bumper having a marginal flange extending downwardly, springs coacting with the opposite end portions of the bumper, portions of said springs adjacent to the bumper being normally spaced apart, said spaced portions of the springs coming one in contact with the other and acting in unison under compression, the connection of said springs with the bumper being rigid, the remainder of said springs serving as a support for the bumper.

6. In combination with the side bar of the frame of a vehicle, a bumper, a support having a portion extending along a side of said bar, a hanger secured to the bar and to the support and positioned for contact with the end of the bar, additional means for securing the support to the bar, and a spring operatively connecting the bumper and the support.

7. In combination with the side bar of the frame of a vehicle, a bumper, a support having a portion extending along a side of said bar, a hanger secured to the bar and to the support and positioned for contact with the end of the bar, additional means for securing the support to the bar, and a spring operatively connecting the bumper and the support, the lower margin of the support being defined by an outstanding flange.

8. In combination with the side bar of the frame of a vehicle, a bumper, a support having a portion extending along a side of said bar, a hanger secured to the bar and to the support and positioned for coaction with the end of the bar, additional means for securing the support to the bar, and means connecting the bumper and the support.

In testimony whereof I hereunto affix my signature.

YUSKE MIYASAKI.